Patented Oct. 24, 1939

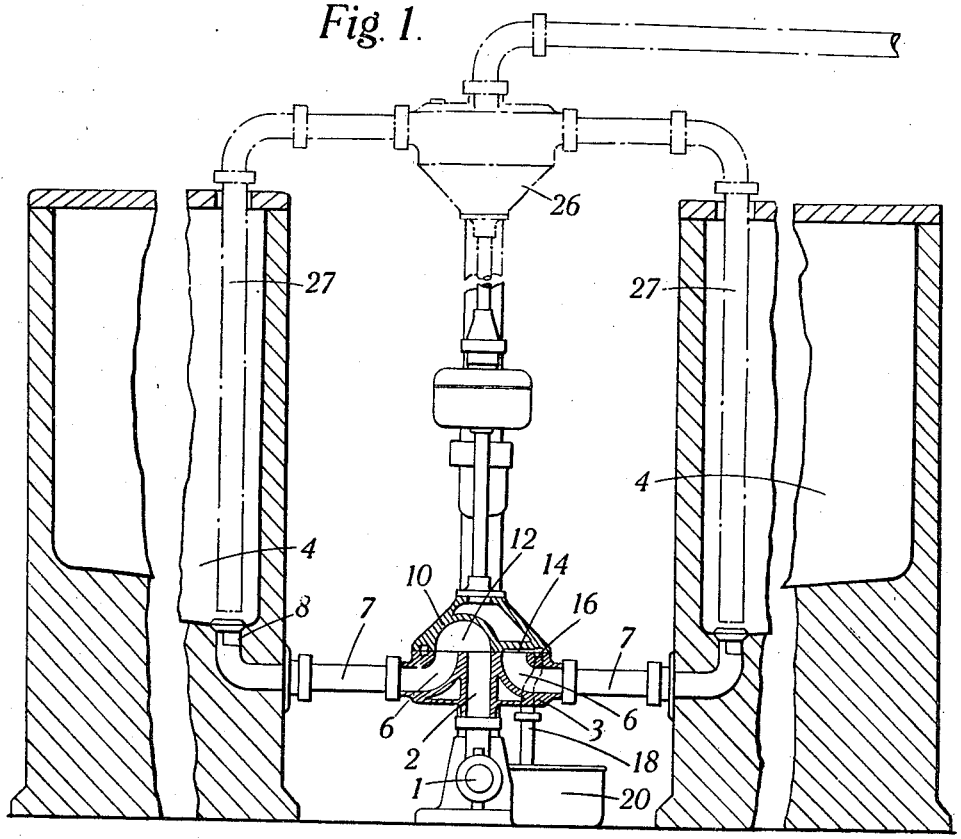

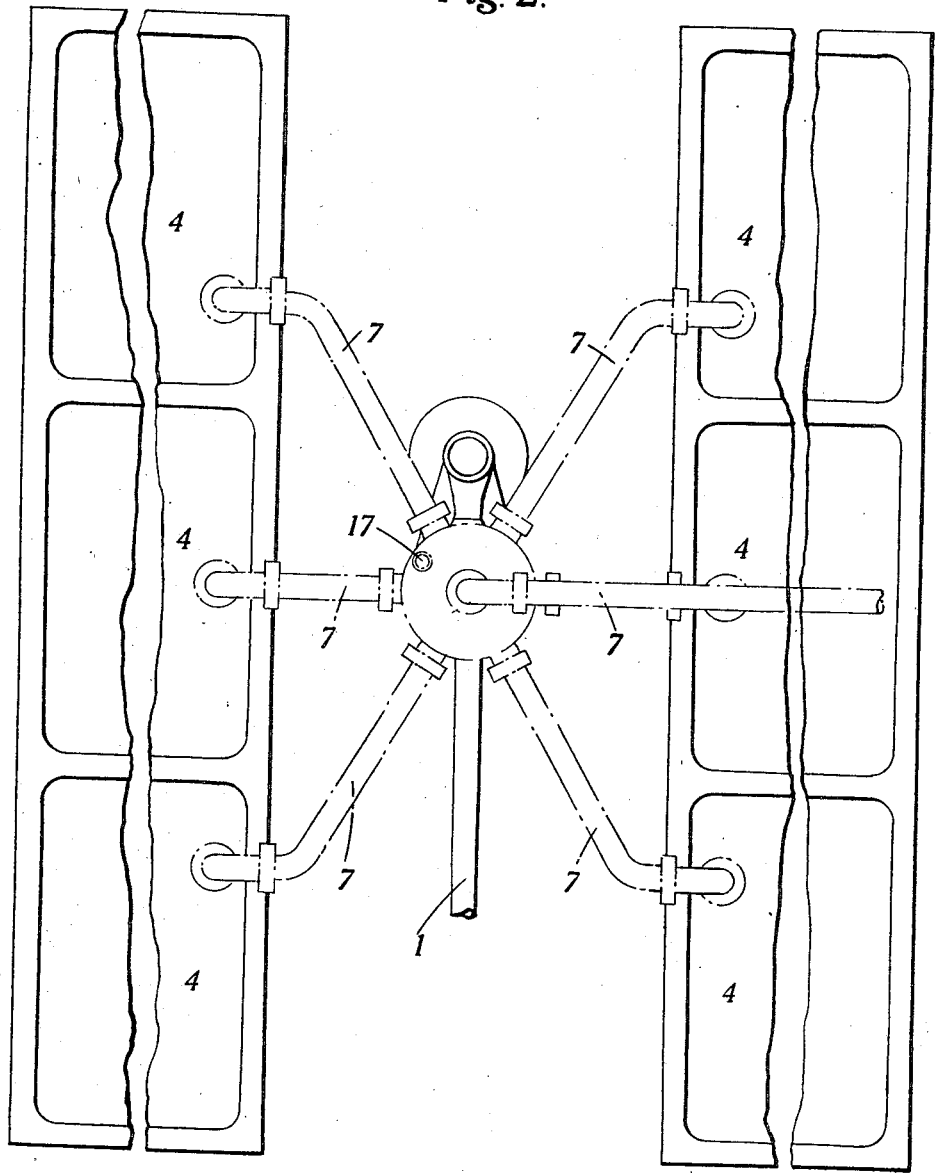

2,177,248

UNITED STATES PATENT OFFICE 2,177,248

APPARATUS OR PLANT FOR TREATING LIQUIDS SUCH AS MILK

Hugh Frederick Goodman, London, England, assignor to The Aluminum Plant & Vessel Company Limited, Wandsworth, England, a British company Application February 19, 1937, Serial No. 126,670
In Great Britain February 28, 1936

5 Claims. (Cl. 137—21)

This invention relates to apparatus or plant for treating liquids, and is particularly concerned with apparatus wherein a source of liquid supply is required to be connected with each of a series of tanks or compartments in succession. The invention is more particularly concerned with apparatus or plant such as is used for what is generally known as the "positive" holding process of treating or pasteurising such liquids as milk.

In the "positive" holding process above referred to, the raw milk after being heated to a predetermined temperature is passed into one or more of a series of holding tanks or compartments and held therein for a definite period of time before being discharged, For the purpose of controlling the charging of the tanks or compartments in proper sequence and at the proper times, a master controller or rotary valve of the nature described in British Patents Nos. 229,438 and 270,030 is frequently used, said controller or valve being arranged and adapted to control cyclically connections between the tanks or compartments and a source of vacuum, a source of compressed air and atmosphere.

According to the present invention, there is provided an improved form of apparatus or plant wherein a controller or rotary valve is provided for controlling cyclically the liquid connections between the source of liquid supply and the inlet points of the various tanks or compartments, which inlet points are situated at the bottoms of the tanks or compartments, and each of them is normally closed by a spring or gravity actuated valve adapted to permit liquid to pass inwardly but not outwardly of the tank.

In carrying the invention into effect, one side of the controller is coupled by a series of conduits with the inlets of the various tanks or compartments, there being a separate conduit for each tank, and the controller is provided with a rotary or otherwise displaceable member provided with ports and adapted to control communication between the said conduits and the source of liquid.

In order that the said invention may be clearly understood and readily carried into effect, the same will now be more fully described with reference to the accompanying drawings in which, Fig. 1 is a vertical sectional view of a part of a milk pasteurising plant incorporating the invention; and Fig. 2 is a plan view of the arrangement shown in Fig. 1.

In the accompanying drawings, 1 is the inlet pipe, one end of which is connected with a heat exchanger or other source of supply of heated milk, and the other end of which is connected with a central opening 2 formed in the fixed body portion 3 of a controller. Disposed around or on each side of the controller are the holding tanks or compartments, into which the heated milk is to be delivered, the arrangement shown being one in which there are six holding tanks or compartments 4 arranged in two groups of three. In addition to the central inlet opening 2, the fixed body portion of the controller is formed with a plurality of radially disposed and preferably downwardly curved outlet passages 6 connected by a series of conduits 7 with inlet openings 8 formed in the bottoms of various tanks or compartments, there being a separate outlet passage and a separate conduit for each tank. The controller is disposed below the level of the bottoms of the tanks, and the fixed body portion thereof is surmounted by a rotary plate 10 formed on its underside with a radially disposed passage or groove 12, preferably of inverted U shape, having its inner end registering with the central inlet opening 2 of the fixed portion of the controller. The outer end of the groove or passage 12 is adapted, upon rotation of the plate 10, to register with each of the outlet passages 6 in turn, the arrangement being such that either only one of the conduits 7 can be connected at a time with the inlet pipe 1 or provision is made for establishing connection with the next conduit before connection with the previous one is interrupted.

Provision is made for preventing milk escaping from one tank or compartment from gaining access to or contaminating milk in another tank or compartment, or for preventing milk being supplied to one tank or compartment from gaining access to any other tank or compartment. For these purposes, the controller may be provided with means for bye-passing to atmosphere any milk that may leak through the controller, and, in the embodiment illustrated, the underside of the rotary plate 10 is formed with an arcuate groove or recessed portion 14 communicating with or merging into an annular groove 16. Annular groove 16 is connected with drain pipe 18 by a passageway shown in dot and dash lines in Fig. 1, thereby draining any milk remaining in the groove 16 into the receiver 20 by way of the drain pipe 18. Rotary plate 10 is provided with a vent 17 (Fig. 2) to vent the recessed portion 14, groove 16, and such of the conduits 7 as are disconnected from the passage 12, to atmosphere. The arcuate extent and disposition of the groove or recess 14 are such that the conduits 7 of all tanks other than the one being filled are connected through the groove 16 and outlet 18 to atmosphere. The controller being below the level of the bottom of the holding tanks, it is impossible for milk to pass into any but the desired tank, as the filling conduits of the other tanks are all connected to atmosphere, and any leakage of milk, e. g. past the tank valves or along the joint between the fixed and the movable parts of the controller, will drain away into the receiver 20.

The displaceable part of the controller may be operated manually or by power means.

The tanks may also, if desired, be provided with means for discharging the same by a syphoning action, and a second controller 26 may be provided so that the outlet therefrom is adapted to be connected with each of a series of downwardly extending pipes 27 as is described in British Patent No. 469,837, accepted August 4, 1937.

Having now particularly described and ascertained the nature of my said invention and in what manner the same is to be performed, I declare that what I claim is:

1. A rotary valve comprising a fixed body portion, a common inlet passage and a plurality of outlet passages formed in said body portion, a drainage groove common to said outlet passages and adapted to communicate with all of them in succession, a plate rotatably mounted upon said fixed body portion, said plate in rotating connecting each of said outlet passages in succession to said common inlet passage while simultaneously cutting off all communication between each said outlet passage when so connected and the drainage groove and between all of the remaining outlet passages and the common inlet passage without interrupting communication between the said remaining outlet passages and the common drainage groove, and a drainage port connecting said annular groove with atmosphere.

2. A rotary valve comprising in combination a fixed body portion, a centrally disposed common inlet passage, a plurality of separate outlet passages radially surrounding said inlet passage in spaced relation thereto and to each other, and an annular channel surrounding said outlet passages in spaced relation, formed in the upper surface of said body portion, a plate rotatably mounted upon said body portion, the underside of said plate engaging with the upper surface of the body portion to effect sealing contact, recesses with partition walls therebetween formed in the underside of said plate, one of said recesses being effective to establish communication between said common inlet passage and each of said outlet passages individually and in succession as said plate rotates, the other recess being vented to atmosphere, said other recess being effective to connect all of the remaining outlet passages with the annular channel as said plate rotates, said partition walls engaging the upper surface of the body portion in sealing contact to cut off all communication between the inlet passage and the annular channel, and an outlet pipe for draining said annular channel to atmosphere.

3. In a pasteurising system and in combination, a plurality of receiving and holding tanks, each tank having an opening at the bottom thereof, check valves positioned in and normally sealing each of said bottom openings, each check valve being operable to admit a liquid to be pasteurised into said tank and to cut off return flow thereof, a rotary distributing valve positioned below the level of said tank bottoms, said distributing valve having a common inlet passage for receiving, and a plurality of separate outlet passages for discharging, a liquid to be pasteurised, a plurality of conduits for separately interconnecting said tank openings and said outlet passageways, an annular drainage groove in said distributing valve, and a drainage port connected with said drainage groove for draining any surplus liquid remaining in said drainage groove to a collection point external to said distributing valve, said distributing valve in rotating, automatically connecting said common inlet passage to each of said outlet passages separately and in cyclic order to establish successive passages to said receiving tanks for filling each of said tanks in rotation with a liquid to be held therein until pasteurisation thereof is completed, cutting off all communication between the established passage and all of the remaining outlet passages, and maintaining communication between said common drainage port and all remaining outlet passages via said annular drainage groove, each tank being open at the top under normal conditions of operation to permit prompt removal of the held liquid from each of said tanks separately and in cyclic order as soon as pasteurisation is complete.

4. In a pasteurising system and in combination, a plurality of receiving and holding tanks, each tank having an opening at the bottom thereof, check valves positioned in each of said bottom openings, each valve being operable to permit liquid to pass into its associated tank and to cut off return flow of said liquid, a rotary distributing valve positioned below the level of the tank bottoms, said distributing valve having a central inlet passage and a plurality of radially disposed outlet passages, the number of outlet passages being equal to the number of tanks, individual pipe connections between each outlet passage and each tank, a drainage passage formed within said distributing valve for draining unpasteurised liquid therefrom, a port connecting with said drainage passage for discharging the unpasteurised liquid at a central point for collection preparatory to re-use, said distributing valve being operable in rotating, to complete the establishment of a direct connection between said central inlet passage and each of said outlet passages in cyclic order to establish separate filling connections with each of said receiving tanks in succession to allow each of said tanks to be filled in rotation with a liquid to be pasteurised, to cut off all communication between an established connection and all other outlet passages and with said drainage passage, and means, individual to each tank and connected with the top thereof, operable to effect immediate removal of the held liquid from each of said tanks independently and in the same order in which they were filled as soon as the held liquid is pasteurised.

5. In a pasteurizing system and in combination, a plurality of receiving and holding tanks, each tank having an opening at the bottom thereof, check valves positioned in and normally sealing each of said bottom openings, each check valve being operable to admit a liquid to be pasteurized into said tank and to cut off the return flow thereof, a controller positioned below the level of said tank bottoms, said controller being made up of a fixed part and a rotary part, said fixed part having a common inlet passage for receiving, and a plurality of separate outlet passages for discharging a liquid to be pasteurized, a plurality of conduits for separately interconnecting said tank openings and said outlet passages, said rotary part of the controller having formed therein a passage registering at one end with the common inlet passage, the passage in said rotary part in rotating, automatically connecting said common inlet passage to each of said outlet passages separately and in cyclic order to establish a passage with each of said receiving tanks in succession to fill each of said tanks in rotation with a liquid to be held therein until pasteurization thereof is completed, and cutting off all communication between the established passage and all of the remaining outlet passages, and a venting groove between the fixed part and the rotary part of the controller for venting to atmosphere all the outlet passages not for the time being connected with the inlet passage.

HUGH FREDERICK GOODMAN.